(12) United States Patent
Coutu

(10) Patent No.: US 7,495,409 B2
(45) Date of Patent: Feb. 24, 2009

(54) METHOD AND APPARATUS FOR ELIMINATING STALL AND COGGING IN MULTI-PHASE STEPPING MOTORS

(76) Inventor: David Coutu, 37 Meeks Point Rd., East Hampton, CT (US) 06424

(*) Notice: Subject to any disclaimer, the term of this patent is extended or adjusted under 35 U.S.C. 154(b) by 259 days.

(21) Appl. No.: 11/818,947

(22) Filed: Oct. 30, 2006

(65) Prior Publication Data
US 2008/0100249 A1 May 1, 2008

(51) Int. Cl.
G05B 13/02 (2006.01)
G05B 19/19 (2006.01)
G05B 6/02 (2006.01)

(52) U.S. Cl. .................. 318/685; 318/561; 318/621; 318/696

(58) Field of Classification Search .......... 318/280, 318/609, 610, 615, 621, 685; 701/71, 100
See application file for complete search history.

(56) References Cited

U.S. PATENT DOCUMENTS

| | | | |
|---|---|---|---|
| 3,793,576 A * | 2/1974 | Masuzawa et al. ......... 318/621 |
| 4,042,868 A * | 8/1977 | Rhodes ................. 318/615 |
| 4,345,194 A * | 8/1982 | Green ................. 318/621 |
| 4,684,866 A | 8/1987 | Nehmer et al. |
| 4,707,650 A * | 11/1987 | Bose ................. 318/685 |
| 4,713,594 A * | 12/1987 | Bose et al. ............ 318/685 |
| 4,933,620 A * | 6/1990 | MacMinn et al. ....... 318/696 |
| 4,953,076 A * | 8/1990 | Yamamoto ............. 700/71 |
| 4,967,129 A * | 10/1990 | Tanaka ................ 318/621 |
| 5,012,171 A * | 4/1991 | Sember ............... 318/696 |
| 5,189,620 A * | 2/1993 | Parsons et al. .......... 701/100 |
| 5,663,624 A | 9/1997 | Callaway |
| 5,723,928 A | 3/1998 | Imai et al. |
| 6,850,026 B2 * | 2/2005 | Takemori et al. ....... 318/685 |
| 6,897,633 B2 * | 5/2005 | Kuwano et al. ........ 318/685 |
| 7,116,070 B2 | 10/2006 | MacKay |
| 2003/0173929 A1 * | 9/2003 | Takemori et al. ....... 318/685 |
| 2005/0200213 A1 * | 9/2005 | Takeuchi ............. 310/68 B |
| 2006/0220603 A1 * | 10/2006 | Takeuchi ............ 318/280 |
| 2007/0040529 A1 * | 2/2007 | Takebayashi et al. .... 318/685 |
| 2007/0216335 A1 * | 9/2007 | Takemori et al. ....... 318/685 |

* cited by examiner

Primary Examiner—Paul Ip

(57) ABSTRACT

The lead or lag relationship between the stator and rotor of a stepper motor is monitored on a continuing basis by an incremental encoder, in feed-back relation, and adjusts the lead or lag to within optimum range values to thereby prevent motor stalls and motor cogging.

5 Claims, 5 Drawing Sheets

METHOD AND APPARATUS FOR ELIMINATING STALL AND COGGING IN MULTI-PHASE STEPPING MOTORS

BACKGROUND OF THE INVENTION

This invention relates to stepper motors such as described within U.S. Pat. No. 6,967,425 entitled "Multi-Functional Electric Stepper Motor Assembly Having Increased Motor Torque" and U.S. Pat. No. 6,879,128 entitled "Method and Apparatus For Independently Controlling Each Phase of a Multi-Phase Step Motor", which patents are incorporated herein for purposes of reference.

One problem generally associated with such stepper motors is the possibility of motor stall when the torque generated by the associated load exceeds the motor rating.

A further problem occurs when the associated load causes the motor rotor to lead or lag the motor stator to such an extent as to cause the rotor to jump from one stable position to a new stable position, which is known as "cogging".

When such stepper motors are employed in commercial applications, the torque load generated by the associated equipment is estimated and the rating of stepper motors employed is then selected to exceed the estimated load by as high as fifty percent to defer the onset of such stalling or cogging.

One approach used to defer the occurrence of motor cogging is described within U.S. Pat. No. 5,250,867 entitled "Permanent Magnet Brushless DC Motor Having Reduced Cogging" wherein the motor stator is custom configured.

To employ a motor of equivalent load rating, a feedback circuit including a digital signal processor, such as that described within U.S. Pat. No. 6,121,744 entitled "Control Apparatus for Position Control Motor" and U.S. Pat. No. 7,081,730 entitled "Motor Controller System for Large Dynamic Range of Motor Operation" is usually required.

In most applications, the feedback circuit for preventing stalling is incorporated within the servo-motor circuit, per se, and cannot be used with existing motors One purpose of the instant invention is to provide a simple arrangement whereby the position of the motor rotor to the motor stator is monitored and controlled on a continuing basis to defer the onset of stalling or cogging at all times of motor operation.

A further purpose of the invention is to provide an add-on rotor-stator control circuit for use with an existing motor arrangement when additional or changing loads are applied, as well as enabling an existing motor to accommodate a load which may from time to time exceed the rating of the motor.

SUMMARY OF THE INVENTION

The lead or lag relationship between the stator and rotor of a stepper motor is monitored on a continuing basis to determine the possible occurrence of motor stalls and motor cogging. Digital comparators are employed to determine when such lead or lag is equal to or greater than a predetermined value and an incremental encoder provides such information in feed-back relation to thereby prevent motor stalls and motor cogging.

DESCRIPTION OF THE PREFERRED EMBODIMENT

Figure 1:
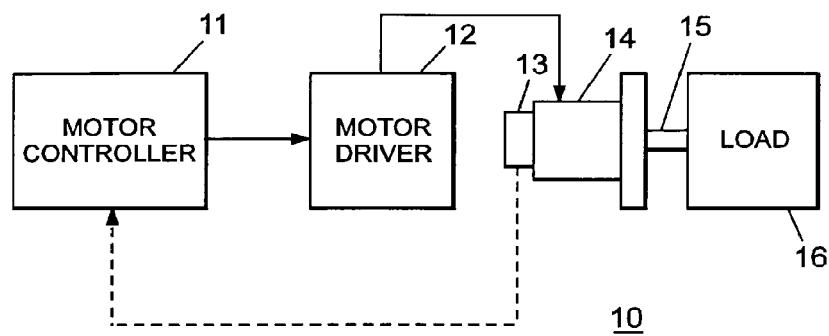
FIG. 1 is a block diagram of a typical stepper motor system.
Figure 2:
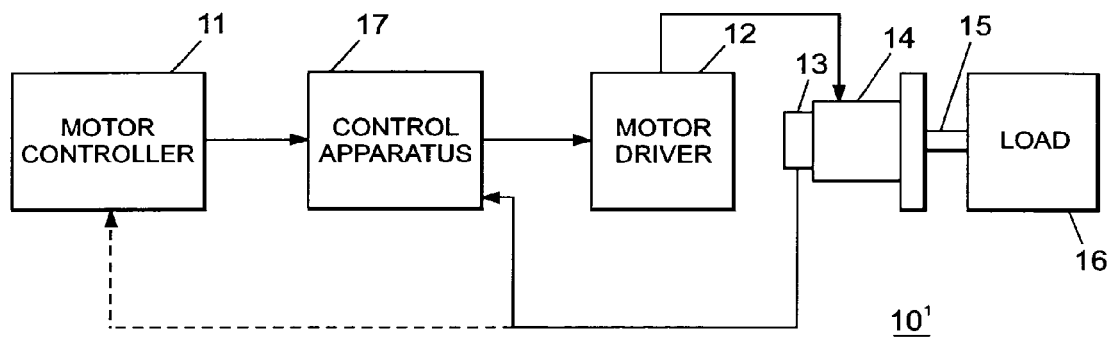
FIG. 2 depicts the system of FIG. 1 with the control apparatus interposed between the motor controller and the motor driver.
Figure 3:
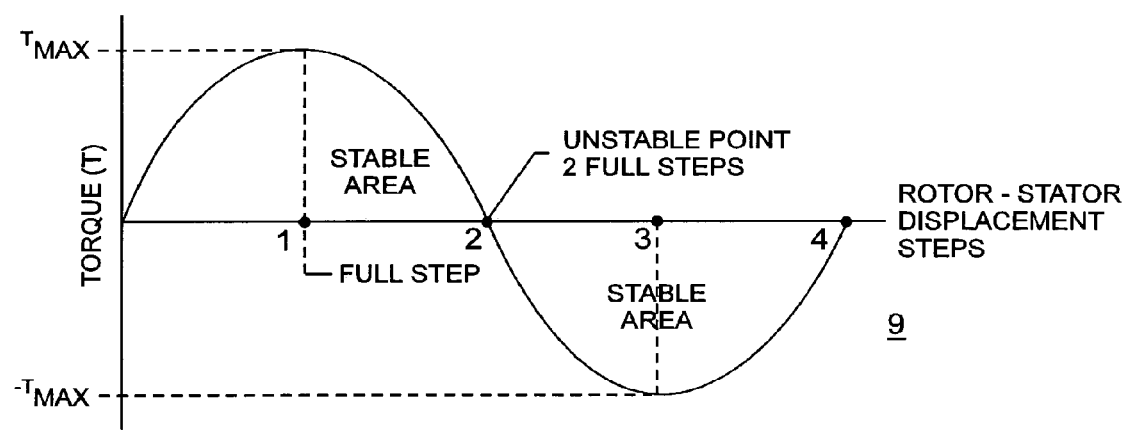
FIG. 3 is a graphic representation of the motor torque as a function of rotor-stator displacement.

Before referring to the circuit components of the invention, as shown in FIGS. 1 and 2, the following information shown in FIG. 3 is helpful to a better understanding of the invention.

FIG. 3 represents a stepper motor torque output waveform 9 as a function of the stepper motor-stepper motor stator displacement steps.

As shown in FIG. 3, a stepper motor produces maximum torque when the rotor is leading or lagging the stator by a full step.

When the rotor reaches a lead or lag equaling 2 full steps, the motor is in a very unstable state. If the rotor is allowed to approach a lead or lag equaling 2 full steps, the rotor may jump to the next stable position. If this occurs synchronism between the commanded commutation frequency and the actual rotor frequency may be lost.

To eliminate this possibility, the rotor must be kept in the stable region indicated wherein the rotor leads or lags the stator by or near one full step, whereby the motor will produce maximum torque.

In a typical servo loop an error signal is generated that is proportional to the lead or lag of the rotor. This error is then used to calculate the new speed in which the motor must move in order to minimize the error. In a system needing fast response or quick reaction to changing loads, a significant amount of processing is required to control the system.

By using a feedback device such as an incremental encoder, for example, the position of the rotor can be detected. By knowing the rotor position and commanded position, the lag (the rotor trailing behind the stator) can then be calculated. As long as the calculated lag is equal to or less then one full step the motor will continue to rotate synchronous to the applied commutation. If the lag exceeds one full step, the stator must wait for the rotor to catch up or the rotor may enter an unstable location at which time cogging may occur, or the motor may stall.

A stepper motor moves in discrete steps, as the current is changed in the windings, to create either a clockwise or counterclockwise movement. The motor will rotate by finite amounts depending on the magnitude of the current change and the load applied to the motor shaft. The incremental encoder described herein provides 10 pulses per full step and the waveform used to commutate the stator comprises 10 micro steps per full step.

Upon commutation of the stator, the position of the rotor to the stator is observed. As a lag starts to occur between the rotor and the stator, a torque is produced. As long as the torque exceeds the amount needed to move the load applied to the motor, the rotor will start to rotate.

As the motor rotates, the difference or "delta" in counts between the rotor and stator is updated. As long as the delta between the rotor and stator remains at 10 counts (one full step) or below, no action is taken. If the delta between the rotor and the stator reaches 11 counts, the load applied to motor has become greater than the torque available at the commutation frequency and the rotor lag or lead must be brought back to 10 counts or less.

When this occurs in a lag condition, the commutation of the stator is stopped and held at the last current level giving the rotor the opportunity to catch up, When the delta between the rotor and stator drops to 10 counts or below, the stator commutation will continue as long as the count remains at 10 or below. If the count of 11 is again reached commutation will once again stop waiting for the rotor to catch up.

If the delta count goes to 12, the rotor has stopped and has now started to reverse from the commanded direction of rotation. If allowed to continue, the rotor will start to move closer to an unstable position. If this occurs the rotor may jump to the new stable location causing cogging. To prevent this from occurring one micro step is taken opposite the commanded direction. This will realign the stator to within 11 counts of the rotor after which the commutation is stopped, as above, until either the count drops to 10, at which time the commutation will continue, or the count increases to 12 and a step in the reverse direction is again made.

A lead condition (the rotor leading the stator) is handled differently. Lead conditions can occur for various reasons such as a high deceleration rate, or a load becoming decreased. In either case the rotor will tend to lead the stator. As in the lag condition no action is taken until the lead count exceeds 10 (one full step), which produces the highest amount of torque. Unlike a lag condition, however, the stator is not stopped because stopping the commutation of the stator would only cause the delta to increase causing a further decrease in motor torque.

If the rotor lead count increases to 11, to maintain maximum torque as well as prevent the rotor from entering an unstable location, which may create an undesirable jump ahead to a new stable position causing cogging, a micro step in the commanded direction is inserted. This will advance the stator to within 10 counts keeping it at a position of maximum torque, at which time the commutation will continue as long as a lead condition exists at 10 counts or below.

In either case of lead or a forced motor reversal, by holding the lead and lag position between the rotor and stator respectively, a breaking force is applied to the rotor helping to control the load which has become greater than the torque which the motor is capable of producing.

By adding a counter that maintains the difference between the commanded steps and the actual number of steps output to the motor driver, the method described herein can work as a positioning system. By injecting lost steps when the rotor is within limits, the motor will position to the commanded number of steps. Variable timing can be used between the injected steps to control the maximum acceleration and velocity of the motor due to the injected steps if required. The difference in steps can also be saved and made available to the controlling device if it is preferred that the controlling device is to maintain position control.

Diagnostic signals can also be generated to indicate that the stator is in a holding pattern waiting for the rotor to catch up. When connected with a timer, a signal can also be generated signaling that the rotor has not advanced during the specified time indicating that a locked rotor condition exists. If the lag between the rotor and stator increases by another count, a signal can be generated that indicates the rotor has reversed direction, and that the applied torque by the load has become greater then the torque which the motor can produce.

In the case were a lead exists, a signal can be generated that indicates the stator was advanced with respect to the incoming step command indicating that the applied torque by the load has become greater than the torque which the motor can produce.

The invention is best understood by now referring to the following FIGS. 1-2 and 4-6.

A typical stepper motor arrangement 10 is depicted in FIG. 1 similar to that described in aforementioned U.S. Pat. No. 6,967,425 wherein a motor controller 11 generates the step pulses and direction signals described earlier, and supplies the pulses and signals to the motor driver 12. The motor driver then generates the commutation signals needed to drive the motor phases within motor 14 causing the motor shaft 15 to rotate load 16 at the commanded speed and direction.

A similar stepper motor arrangement 10' is depicted in FIG. 2 with the control apparatus 17 of the invention interposed between the motor controller 11 which produces the commanded steps and direction, and the motor driver 12, which contains the power devices used to commutate the motor 14 via encoder 13. The control apparatus 17 receives pulse signals indicating rotor positions along with the commanded steps and direction signals from the motor controller 11.

The control apparatus 17 for elimination of stalls and cogging, as described earlier, is shown in detail in FIG. 4.

A delta calculation element 18 calculates the positional lead or lag between the rotor and stator within the motor 14 of FIG. 2, and inputs the acquired data to a comparator element 19 to indicate when the lead or lag is less than or greater than the established limits supplied by the data storage element 20. A sequential state logic element 21 receives the input from the comparator element to take appropriate actions based on the positional difference between the stator and rotor within the motor 14.

Figure 4:
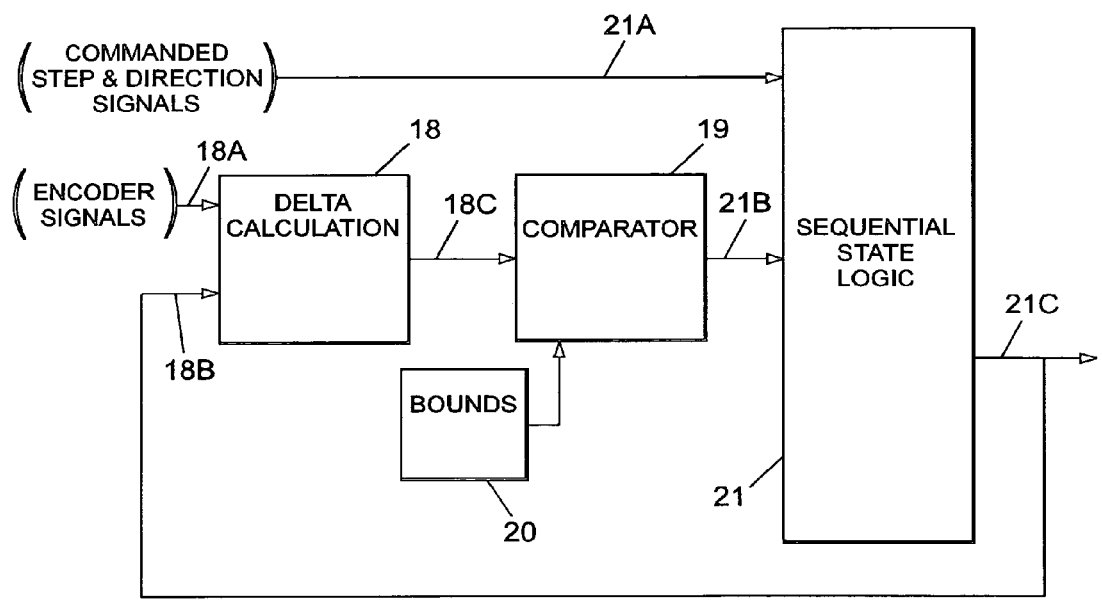
FIG. 4 is a block diagram of the control apparatus of FIG. 2 adapted for the elimination of stalls and cogging.

The operation of the control apparatus 17 is best understood by referring now to FIGS. 2-4.

The rotor-stator displacement steps (1-4) of FIG. 3 are representative of the delta between the commanded stator position and the actual rotor position. When a full step is presented to the motor driver 12, via the sequential state logic element 21 of FIG. 4, the motor stator is advanced by one position. This sequence will repeat for every 4 full steps presented to the motor drive 12. One encoder step indicates that the rotor position has changed by one increment. For this embodiment, the motor driver 12 of FIG. 2 operates in a micro-stepper mode of 10, that is, for every 10 steps presented to the motor driver the stator will be advanced one full motor step.

The encoder 13 is an incremental encoder utilizing 500 lines to produce 10 encoder steps for a rotor movement of one full motor step when used with a 200 full step per revolution motor. It is understood that the control apparatus 17 will operate with different motor step ratios and different encoder line counts.

The delta calculation element 18, shown in FIG. 4, utilizes two inputs 18A, 18B and generates one output 18C. The first input to the delta calculation element at 18A provides encoder signals from the encoder 13 in FIG. 2, which represent the position of the rotor within the motor 14 therein.

The second input to the delta calculation element at 18B provides the step and direction signals from the sequential state logic element 21.

The delta calculation element output at 18C provides the delta, hereafter "difference" in counts between the rotor position and the stator position, representing rotor lead or lag, which is inputted to the comparator element 19.

The comparator element 19 determines whether the lead or lag of the rotor 15 of FIG. 2 is greater than the established limits provided to the comparator via data storage element 20 and inputs such information, indicative of whether the lead or lag is out of limits, to the sequential state logic element 21. The limits for lead or lag herein are set at +10 for lead and −10 for lag such that, an out-of-limits lead condition is indicated to the sequential state logic element when the difference is equal to or greater than +11 and an out-of-limits lag condition is indicated when the difference is equal to or less than −11, accordingly.

The sequential state logic element 21 includes two inputs 21A, 21B and generates one output 21C. Input 21A provides the commanded step and direction signals provided by the motor controller 11 in FIG. 2 and input 21B receives the lead or lag information supplied by the comparator 19, as described earlier.

The output 21C provides corresponding step and direction signals to the motor driver 12 of FIG. 2 for correcting the movement and direction of the motor shaft 15 extending from the motor 14 and transmits such signals back to the delta calculation element 18, on a continuing basis.

Figure 5:
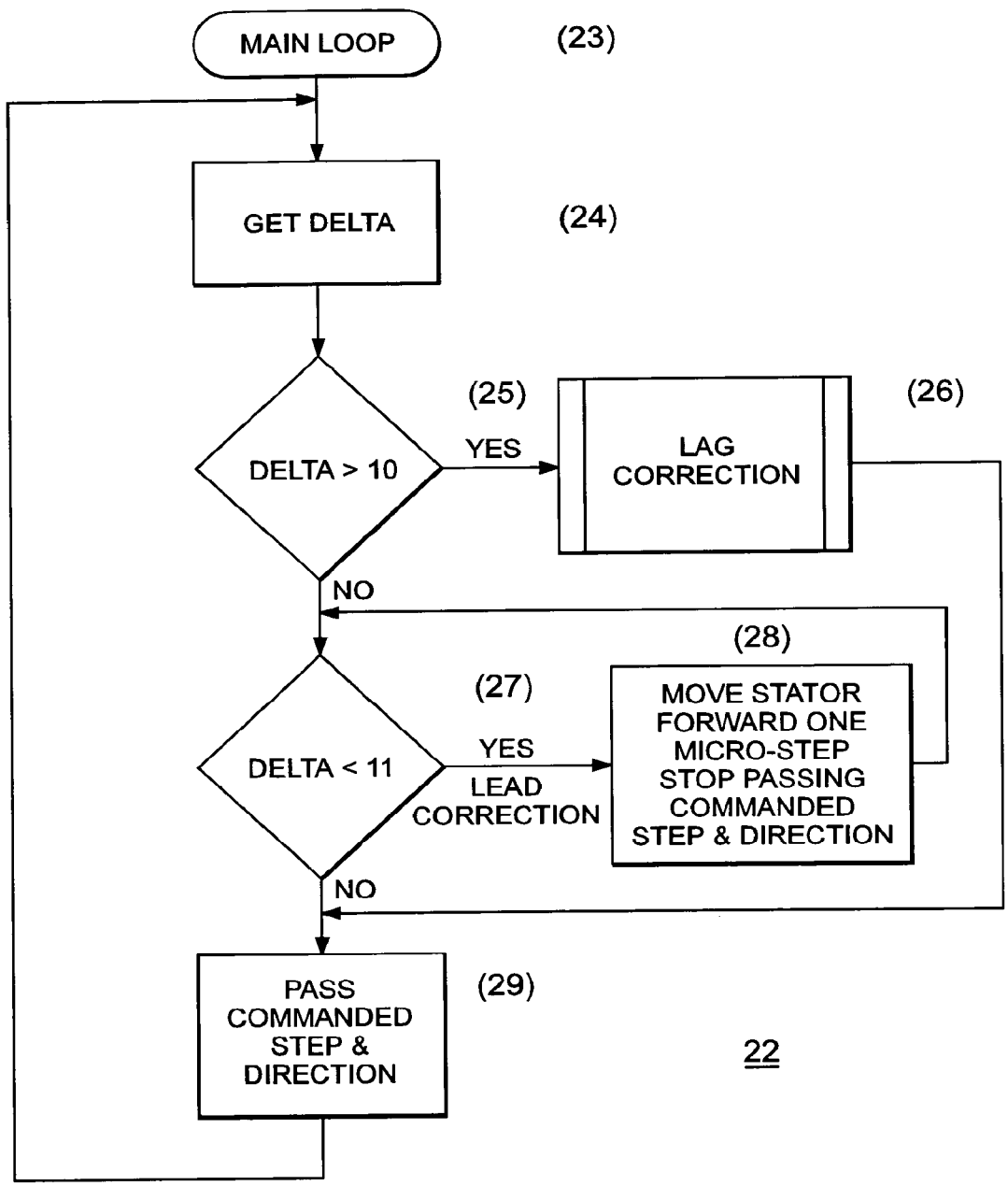
FIG. 5 is a flow chart representation of the sequential state logic used within the control apparatus of FIG. 2.

The flow chart 22 within the sequential state logic section 21 for controlling the relationship between the motor rotor and motor stator to prevent motor stalls is shown in FIG. 5 and operates as follows:

The main loop (23) instructs the delta calculation element 18 in FIG. 4 to obtain delta, hereafter "D" consisting of stator counts minus rotor counts, from the encoder signals at (24) and a determination is made as to whether D is greater than 10 counts (25).

Figure 6:
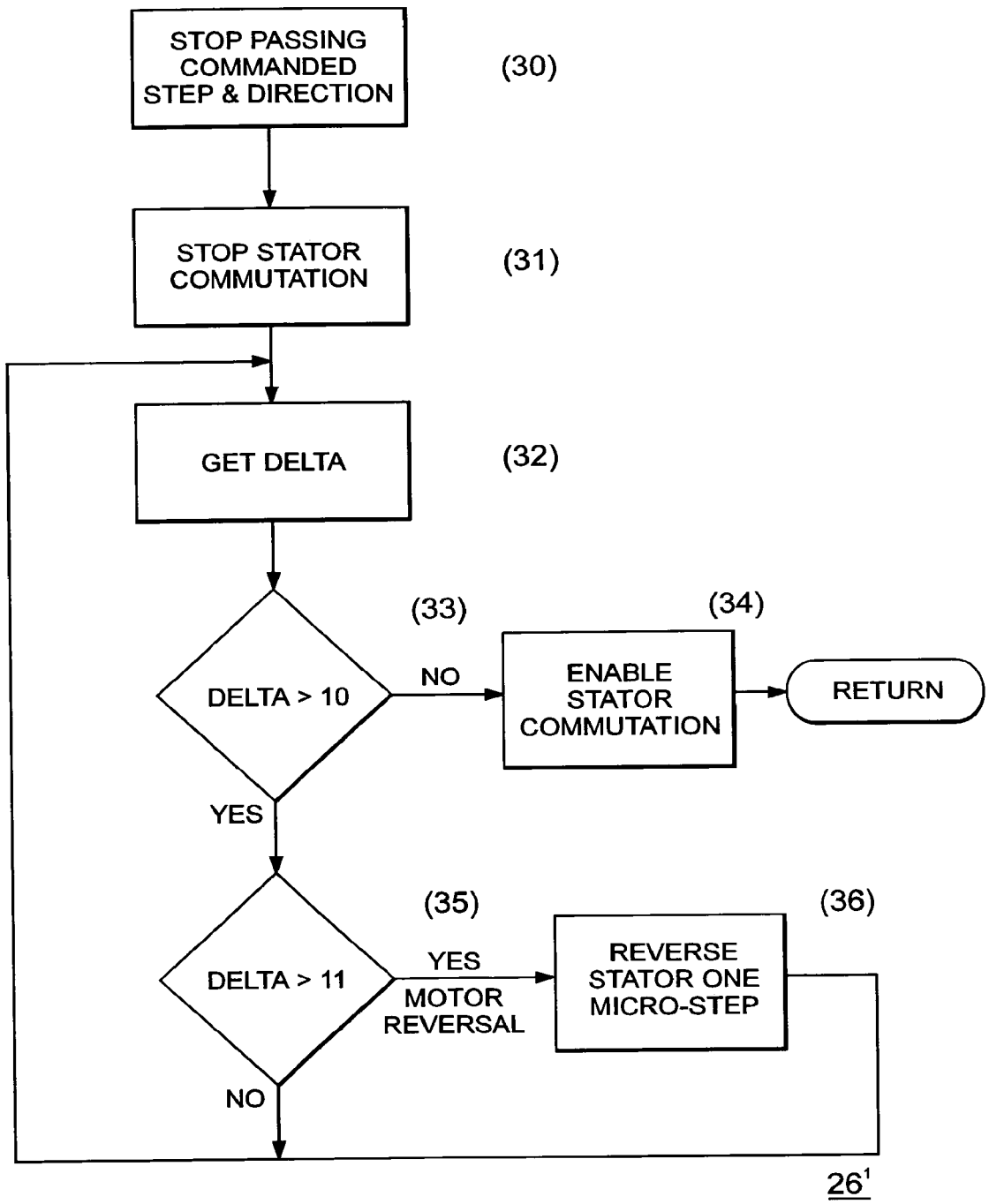
FIG. 6 is flow chart representation of the lag correction logic used within the control apparatus of FIG. 2.

If the D is greater then 10 a lag condition exits, which must be corrected (26) via the flow chart for lag correction (26') shown in FIG. 6.

If D is not greater than 10 counts a determination is made as to whether D is less than −11 counts (27). If D is not less than −11 counts the commanded step and direction data is allowed to pass to the motor driver 12 of FIG. 4 (29).

If D is less than −11 counts a lead condition exists, the stator is moved forward one micro-step, the commanded step and direction data is not allowed to pass to the motor driver 12 and a determination is made as to whether D is less than −11 counts (27) before the commanded step and direction data is allowed to pass to the motor driver 12 of FIG. 4.

The flow chart for lag correction (26') shown in FIG. 6 and operates in the following manner.

The commanded step and direction function is stopped (30) and the stator commutation is stopped (31) to allow the rotor to catch up to the stator and D is again obtained (32).

A determination is made as to whether D is greater than 10 counts (33). If not, a lag no longer exists, and the stator commutation is again enabled (34) allowing the commanded step and direction signal input to the motor driver.

If D is greater than 10 counts, a determination is made to whether D is greater then 11 counts (35). If D is not greater than 11 counts the stator continues to be stopped (31) and D is again obtained (32).

If D is greater than 10 counts and greater than 11 counts, the stator is reversed one micro-step (36) and D is again obtained (32).

If D is greater then 11 counts, the motor is rotating in reverse and the stator is reduced by one micro-step (25).

A simple arrangement for controlling motor rotor and stator operation for preventing motor stall and cogging has herein been described. The above method indicates the use of a 2-phase rotary stepper motor, however any multiphase linear or rotary stepper, or brushless motor can be used.

Although a 500 line rotary incremental encoder and a micro step resolution of 10 micro steps per step utilizing a 200 full step per revolution stepper motor are disclosed, different encoder types and counts as well as different micro step resolutions can be used to achieve a similar result.

What is claimed is:

1. A circuit for providing optimum performance of a stepper motor comprising:
a rotor-stator control circuit interconnecting between a stepper motor controller, a stepper motor driver and a stepper motor, said stepper motor defining a total number of steps per rotation thereof; and
an incremental encoder within said rotor-stator control circuit for insuring a rotor within said stepper motor lags a stator within said stepper motor by less than or equal to one of said steps for optimum stepper motor performance.

2. The circuit of claim 1 wherein said means within said rotor-stator control circuit further insures said rotor leads said stator by less than or equal to said one step for said optimum stepper motor performance.

3. An adapter circuit for allowing use of a stepper motor having a maximum motor rating to be used temporarily above said maximum rating comprising:
a rotor-stator control circuit arranged for connecting with a stepper motor for receiving positional status of a rotor and a stator within said stepper motor;
a delta circuit for determining a difference in rotation position and direction between said rotor and said stator, said delta circuit including an incremental encoder;
a pair of digital comparators connecting with an output from said delta circuit for determining lead or lag status between said rotor and said stator; and
a logic device connecting with said comparators and with a stepper motor driver, said driver providing operating current to said rotor and said stator, whereby said rotor is controlled to lag said stator by a fixed position to avoid stalling said stepper motor.

4. The adapter circuit of claim 3 whereby said stator is controlled to lag said rotor by said fixed position to avoid cogging said stepper motor.

5. The adapter circuit of claim 3 whereby said stator is controlled to lead said rotor by said fixed position to avoid cogging said stepper motor.

* * * * *